UNITED STATES PATENT OFFICE.

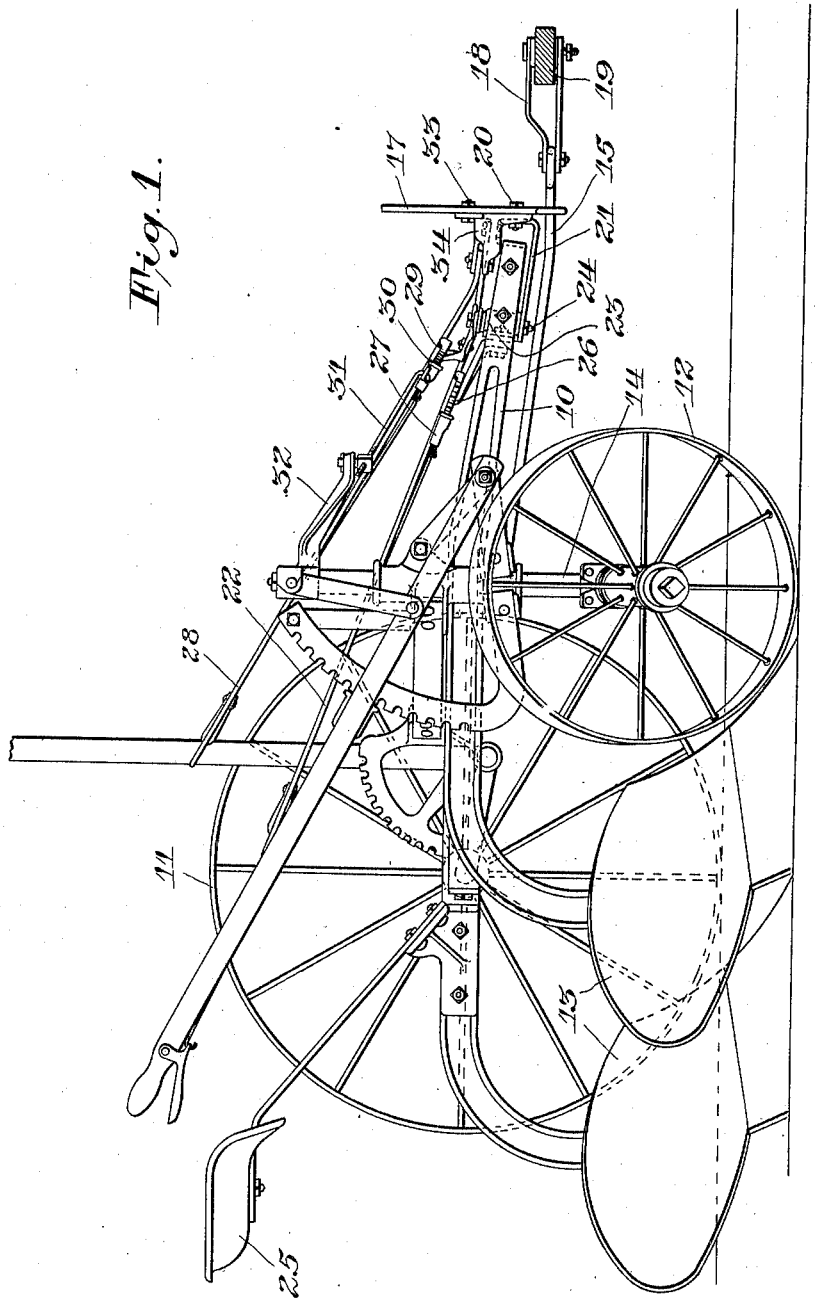

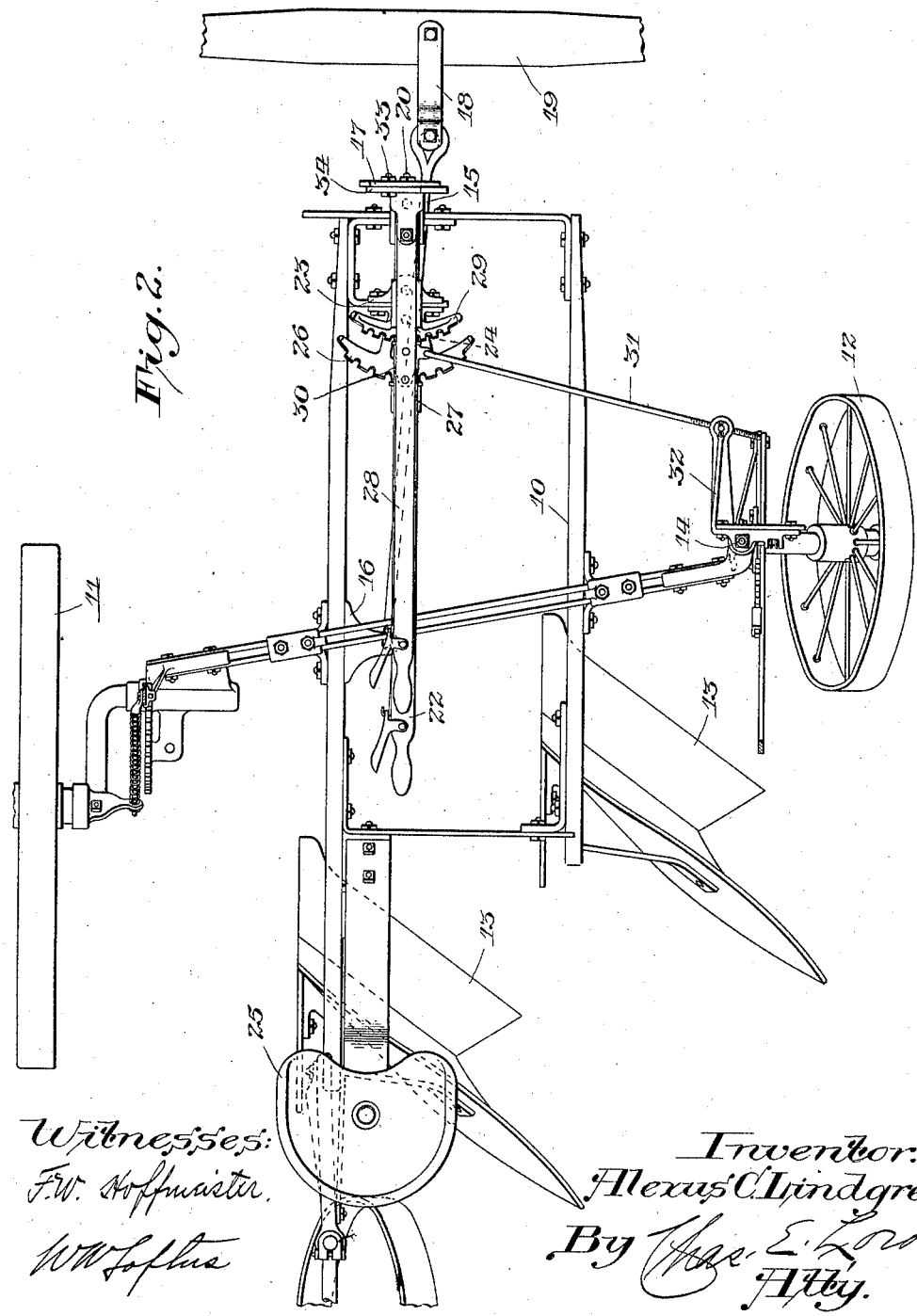

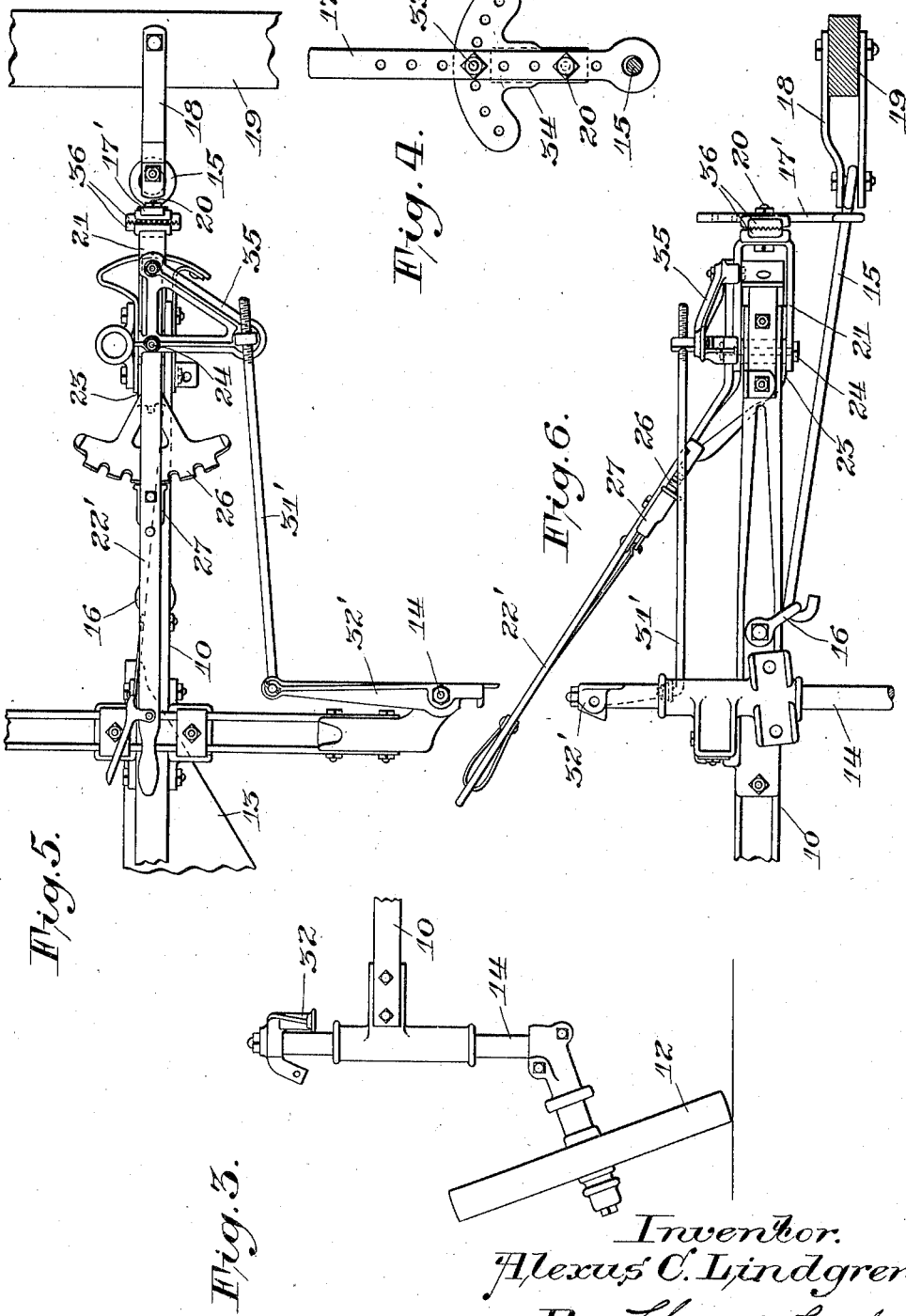

ALEXUS C. LINDGREN, OF MOLINE, ILLINOIS, ASSIGNOR, BY MESNE ASSIGNMENTS, TO INTERNATIONAL HARVESTER COMPANY, A CORPORATION OF NEW JERSEY.

WHEELED PLOW.

1,312,188.     Specification of Letters Patent.     Patented Aug. 5, 1919.

Application filed July 2, 1914. Serial No. 848,538.

*To all whom it may concern:*

Be it known that I, ALEXUS C. LINDGREN, a citizen of the United States, residing at Moline, in the county of Rock Island and State of Illinois, have invented certain new and useful Improvements in Wheeled Plows, of which the following is a full, clear, and exact specification.

My invention relates to wheeled plows, and has for its object to simplify and improve the construction and operation of such devices.

This object I accomplish by the employment of a new and simplified adjusting means whereby a ready and quick change in the course of the plows may be made, and by which a finer adjustment than has heretofore been possible is provided for.

Two forms which my invention may assume are exemplified in the following description and illustrated in the accompanying drawings, in which—

Figure 1 shows a side elevation of a gang plow embodying a preferred form of my invention;

Fig. 2 shows a plan view of the same;

Fig. 3 shows a front elevation of the pivoted furrow wheel employed in my device;

Fig. 4 is a detail view showing an adjustment for the draft connection;

Fig. 5 shows a detail view in plan of a modified form of my improved adjusting device adapted for sulky plows; and Fig. 6 shows a detail view in side elevation of the same.

Referring now in detail to the forms of my invention which are herewith illustrated, and in particular to the preferred form illustrated in Figs. 1 and 2, it will be seen that it comprises a carrying frame 10 provided with a land wheel 11, a furrow wheel 12, and equipped with two or more plowing members 13. The furrow wheel is provided with a shank portion 14, which is pivoted to the frame, and is made adjustably movable to change the course of the plows, as will hereinafter be described. Draft connections are provided for the frame, and include a link member 15 pivoted to the frame by any suitable means 16, and, extending forwardly, is carried near its front end in an independently adjustable pendent member 17. A clevis 18 is pivoted to the forward end of the member 15 and receives an equalizing bar 19, to which the draft animals are hitched. The pendent link 17 is mounted, by means of a pivotal connection 20, upon a U-shaped bracket 21, which is connected to the end of a primary adjusting lever 22, both the bracket and lever being pivoted to a supporting member 23 at a point 24, the lever extending rearwardly to a position adjacent the driver's seat 25. Rigid with the supporting member 23 is a sector 26 to receive the detent mechanism 27 of the lever 22. Pivoted to the lever 22, forwardly of the pivot point 24, is a secondary adjusting lever 28 extending rearwardly above and inclined with the primary adjusting lever. A sector 29, which is secured rearwardly of the pivot point 24 of the lever 22, is provided for the secondary adjusting lever 28, the latter having a detent mechanism 30 to coact therewith. A link 31 is pivoted to the lever 28 and extends transversely of the frame and has an adjustable connection with a crank arm 32, which is fixed to the pivoted shank 14 of the furrow wheel and extends in a forward direction.

It is understood, of course, that, due to varying conditions, plows of this kind often fall out of alinement and cut a furrow which is either too wide or too narrow for the purposes intended. Obviously, with a construction such as that just described, a movement of the primary lever will swing the pendent link 17 in either direction about the pivot point 24 of the bracket and lever, carrying with it the draft link 15 and thereby, in operation, changing the course of the entire frame with respect to the line of pull exerted by the draft animals. At the same time the secondary adjusting lever will necessarily be moved and, through the link connection 31, the furrow wheel will be deflected in the proper direction for coöperating with the angled draft connections to more quickly and positively alter the course of the plows. By moving the secondary adjusting lever independently upon its pivot only the furrow wheel is adjusted, but in a quicker manner, owing to the change in the pivot point about which the lever is moved. In this way a direct means is provided for altering the position of the wheel to keep it in its proper position in the furrow. The double adjustment is advantageous to quickly bring the plows to their proper cutting width, whereas the independent adjustment of the furrow wheel allows for a finer adjustment than has heretofore been possible in devices of this class, in that the wheel can thereby be properly positioned in the furrow. Moreover, this independent adjustment of the wheel at an increased speed is decidedly advantageous for use in making quick and short turns at the end of the field.

Should one of the draft animals habitually delay its work, thereby causing the plows to cut into the land too much or too little, the primary adjusting lever can be set to provide for an even draft, although, if this is to be in the nature of a permanent condition, then the pendent link 17 may be swung about its pivot point 20 by loosening a bolt 33 which operates in a series of openings in a bracket 34, and a fixed adjustment of that member may be made to offset the uneven draft. The primary adjusting lever can thus be left near its central position, and thereby have a maximum movement in either direction for temporary changes.

In the modified form of this adjusting device illustrated in Figs. 5 and 6 I have dispensed with the secondary adjusting lever and have shown it as applied to a frame carrying a single plow; or, in other words, a sulky plow. The operation of this form of my device is substantially similar to the one above described, the differences residing mainly in structural alterations. In this form a bracket 35 is mounted upon the forward end of the lever 22$^1$ and projects laterally, and at its outer end the link 31$^1$ is adjustably swiveled thereon. The crank arm 32$^1$ secured to the furrow wheel shank, in this instance, extends inwardly, and a more compact arrangement is thereby obtained. The pivotal connection in this form for the pendent link 17$^1$ is made adjustable and held in position by the employment of ratchet clamping members 36.

It is obvious that other modifications than that shown herein may be made of my invention, and, therefore, I do not limit myself to the forms herein shown except as may be necessitated by the state of the prior art.

What I claim as my invention, and desire to secure by Letters Patent, is:

1. In a wheeled plow, a frame, a swinging draft connection therefor, a plurality of connected adjusting levers arranged to swing in substantially horizontal planes and carried on said frame and having a connection with said draft connection, a pivoted furrow wheel, and means whereby said furrow wheel may be actuated by any one of said levers.

2. In a wheeled plow, a frame, a swinging draft connection therefor, an adjusting lever pivoted on said frame and having a connection with the draft connection, a second lever pivoted to said first mentioned lever and adjustable thereon, a pivoted furrow wheel, and a connection between said pivoted furrow wheel and the second named lever.

3. In a wheeled plow, a frame, an adjusting lever pivoted thereon, swinging draft connections for said frame connected at one end to said lever, a second lever pivoted to said first mentioned lever forwardly of its point of pivot to the frame and adjustable thereon, a furrow wheel pivoted to said frame, a crank arm connected to said furrow wheel, and a link connecting said crank arm with said second mentioned lever.

4. In a wheeled plow, a frame, a draft link pivoted to said frame, an adjusting lever having a U-shaped end portion and pivoted intermediately to said frame, a connection between said U-shaped end portion and the draft link, a second lever pivoted to said first mentioned lever and adjustable thereon, a pivoted furrow wheel, and a connection between said furrow wheel and said second mentioned lever.

In testimony whereof I affix my signature in the presence of two witnesses.

ALEXUS C. LINDGREN.

Witnesses:
W. A. LOFTUS,
S. L. ROCKULP.